United States Patent
Maekubo et al.

(10) Patent No.: US 8,789,786 B2
(45) Date of Patent: Jul. 29, 2014

(54) GAS FLOW STRUCTURE AND WEBBING TAKE-UP DEVICE

(75) Inventors: Yoshiaki Maekubo, Aichi-ken (JP); Masaru Ukita, Aichi-ken (JP); Wataru Yanagawa, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 328 days.

(21) Appl. No.: 13/188,952

(22) Filed: Jul. 22, 2011

(65) Prior Publication Data

US 2012/0024404 A1    Feb. 2, 2012

(30) Foreign Application Priority Data

Jul. 30, 2010  (JP) ................................ 2010-172231

(51) Int. Cl.
    *B60R 22/343*    (2006.01)
(52) U.S. Cl.
    USPC ........... 242/382; 242/384; 60/632; 137/68.23
(58) Field of Classification Search
    USPC .................... 137/68.23; 242/383.2, 384, 382; 280/737, 806; 102/530; 60/632
    See application file for complete search history.

(56) References Cited

U.S. PATENT DOCUMENTS

| | | | | |
|---|---|---|---|---|
| 3,836,170 | A * | 9/1974 | Grosch et al. ................. | 280/737 |
| 5,462,307 | A * | 10/1995 | Webber et al. ................ | 280/737 |
| 5,558,367 | A * | 9/1996 | Cuevas .......................... | 280/737 |
| 5,601,308 | A * | 2/1997 | Cuevas .......................... | 280/736 |
| 5,690,357 | A * | 11/1997 | Cuevas .......................... | 280/737 |
| 5,762,368 | A * | 6/1998 | Faigle et al. ................... | 280/737 |
| 5,786,543 | A * | 7/1998 | Staudhammer et al. ...... | 102/288 |
| 6,062,599 | A * | 5/2000 | Forbes et al. .................. | 280/737 |
| 6,254,128 | B1 * | 7/2001 | Albrecht et al. ............... | 280/736 |
| 6,354,528 | B1 * | 3/2002 | Nagata et al. ............... | 242/383.2 |
| 6,598,904 | B2 * | 7/2003 | Nagata et al. ................. | 280/807 |
| 6,832,782 | B2 * | 12/2004 | Mori ............................. | 280/806 |
| 2007/0001047 | A1 * | 1/2007 | Yasuda et al. .............. | 242/379.1 |

FOREIGN PATENT DOCUMENTS

| | | |
|---|---|---|
| JP | H075992 U | 1/1995 |
| JP | 2007-084042 | 5/2007 |

OTHER PUBLICATIONS

Japanese Notice of Reasons for Rejection and English translation dated Nov. 26, 2013.

* cited by examiner

*Primary Examiner* — John Rivell
(74) *Attorney, Agent, or Firm* — Roberts Mlotkowski Safran & Cole P.C.

(57) ABSTRACT

Plural door portions are formed by sectioning the gas blowing section of the gas generator with slits. In a state in which gas has been generated by the gas generator, the plural door portions part at the slits and open towards the outside of the casing body. A gas flow path section is connected to a peripheral wall section configuring an deployment space permitting opening of the door portions. The gas flow path section is provided with an upstream portion which is in communication with the deployment space and formed along a direction orthogonal to the direction of gas blowing from the gas blowing section, and an opening portion provided at the gas inflow side, which is set so as to communicate with a space which is between adjacent door portions when the door portions 56 are in a opened state.

2 Claims, 6 Drawing Sheets

FIG.6

GAS FLOW STRUCTURE AND WEBBING TAKE-UP DEVICE

CROSS-REFERENCE TO RELATED APPLICATION

This application claims priority under 35 USC 119 from Japanese Patent Application No. 2010-172231 filed Jul. 30, 2010, the disclosure of which is incorporated by reference herein.

BACKGROUND OF THE INVENTION

1. Field of the Invention

The present invention relates to a gas flow structure and a webbing take-up device.

2. Related Art

There are webbing take-up devices configured to control a gas generator to achieve switching capability between a mode rendering locking of an end portion of a specific torsion shaft (a energy absorbing member) not possible (non-lockable), and a mode rendering locking of the end portion of the specific torsion shaft possible (lockable) (see for example Japanese Patent Application Laid-Open (JP-A) No. 2007-84042). For a gas generator in such devices configuration is made with a door portion provided to a gas blowing section, such that gas is blown by opening (deploying) the door portion. In such cases a gas flow path is secured by setting a portion facing the gas blowing section at sufficient distance to the leading end of the door portion when the door is in an open state.

However, it is sometimes not possible to apply a configuration such as this in, for example, devices with limited installation space for the gas generator by the relationship to peripheral equipments.

SUMMARY OF THE INVENTION

In consideration of the above circumstances the present invention is directed towards a gas flow structure and a webbing take-up device capable of securing a gas flow path even with limited distance between a gas blowing section and a portion facing the gas blowing section.

A gas flow path structure according to a first aspect of the present invention includes: a gas generation section that is equipped with a hollow shaped casing body and a gas blowing section, the gas generation section generating gas inside the casing body on actuation thereof and the gas being blown from the gas blowing section; a plurality of door portions that is provided at the gas blowing section and configured such that the gas blowing section is segmented by slits or grooves, the door portions parting at the slits or the grooves in a state where the gas is generated by the gas generation section so as to deploy towards the outside of the casing body; a peripheral wall section configuring a deployment space for permitting the door portions to deploy; and
a gas flow path section for the gas generated by the gas generation section to flow through, the gas flow path section being connected to the peripheral wall section so as to communication with the deployment space, an upstream portion of the gas flow path section being formed along a direction orthogonal to a direction of the gas blowing from the gas blowing section, and an opening portion of the gas flow path section at a side of the gas inflowing being set so as to communicate with a space which is located between the door portions which are adjacent to each other in a state where the door portions are in a deployed state.

According to the gas flow structure of the first aspect of the present invention, the gas generation section generates gas inside the hollow shaped casing body on actuation and blows the gas from the gas blowing section of the casing body. Plural door portions are configured by plural segments segmented by slits or grooves provided to the gas blowing section of the casing body, the door portions parting at the slits or grooves when gas is generated by the gas generation section so as to open (deploy) towards the outside of the casing body. Namely, gas is blown from the gas blowing section of the casing body by the door portions opening (deploying). The gas flow path section employed for gas generated by the gas generation section to flow through is connected to the peripheral wall section configuring a deployment space for permitting the door portions to open (deploy), with the gas flow path section in communication with the deployment space.

The gas flow path section includes the upstream portion formed along the direction orthogonal to the direction of gas blowing from the gas blowing section, and the opening portion at the gas inflow side set to be provided such that it is communicated with space provided between adjacent door portions adjacent to each other in the state where the door portions are opened (deployed). Accordingly, the generated gas flows out from between opened (deployed) door portions through to the gas flow path section even if, for example, due to the positional relationship to peripheral equipment(s), the portion in the peripheral wall section facing towards the gas blowing section is disposed in the vicinity of the leading end portions of the door portions which are opened (deployed).

It is possible that, in the first aspect, when viewed along the direction of the gas blowing: the opening portion of the gas flow path section at the side of the gas inflowing is set to be provided such that an extension line extending from an end of at least one of the slits or the grooves toward a side opposite to a center of the gas blowing section crosses the opening portion of the gas flow path section at the side of the gas inflowing.

The gas flow path structure of a second aspect of the present invention is the configuration of the first aspect, wherein, when viewed along an extension direction of the upstream portion of the gas flow path section: the opening portion of the gas flow path section at the side of the gas inflowing is set to be provided between a first position which is at an outer face position of the gas blowing section and a second position facing the first position, which is separated from the first position in the direction of the gas blowing by a distance of ½ of a length of a maximum diameter of the gas blowing section.

According to the gas flow structure of the second aspect of the present invention, in addition to the operation and effects obtained by the first aspect of the present invention, since when viewed along an extension direction of the upstream portion of the gas flow path section: the opening portion of the gas flow path section at the side of the gas inflowing is set to be provided between a first position which is at an outer face position of the gas blowing section and a second position facing the first position, which is separated from the first position in the direction of the gas blowing by a distance of ½ of a length of a maximum diameter of the gas blowing section, the separation distance between the gas blowing section and the portion on the blown side facing the gas blowing section can be suppressed.

A webbing take-up device of a third aspect of the present invention includes: the gas flow structure of either the first aspect or the second aspect; a spool formed in a tubular shape on which a webbing belt is wound in layer manner; an energy absorbing member housed in an axial center portion of the spool and disposed along an axial direction of the spool, an end portion in the axial direction of the energy absorbing member being retained by the spool; a shaft lock section capable of locking the other end portion in the axial direction of the energy absorbing member; and a switching section that is actuated by the gas flowing through the gas flow path section to switch locking of the other end portion in the axial direction of the energy absorbing member by the shaft lock section to a lockable state or to a non-lockable state.

According to the webbing take-up device of the third aspect of the present invention, the axial direction one end portion of the energy absorbing member is retained by the spool, and the axial direction the other end of the energy absorbing member is lockable by the shaft lock section. On actuation by gas flowing through the gas flow path section the switching section switches locking of the axial direction the other end portion of the energy absorbing member by the shaft lock section to a state lockable or to a state non-lockable.

The gas flow path section includes the upstream portion formed along the direction orthogonal to the direction of gas blowing from the gas blowing section, and the opening portion at the gas inflow side set to be provided such that it is communicated with space provided between adjacent door portions adjacent to each other in the state where the door portions are opened (deployed).

Accordingly, the generated gas flows out from between opened (deployed) door portions through to the gas flow path section even if, for example, due to the positional relationship to peripheral equipment(s), the portion in the peripheral wall section facing towards the gas blowing section is disposed in the vicinity of the leading end portions of the door portions which are opened (deployed). So the switching section is efficiently actuated.

As explained above, the excellent effect is exhibited by the gas flow structure of the first aspect of the present invention of enabling a gas flow path to be secured even if the limited separation distance between the gas blowing section and the portion facing the gas blowing section.

The excellent effect is exhibited by the gas flow structure of the second aspect of enabling the separation distance between the gas blowing section and the portion facing the gas blowing section to be suppressed.

The excellent effect is exhibited by the webbing take-up device of the third aspect of enabling a gas flow path to be secured even if there is limited separation distance between the gas blowing section and the portion facing the gas blowing section, and enabling efficient actuation of the switching section.

BRIEF DESCRIPTION OF THE DRAWINGS

Exemplary embodiments of the present invention will be described in detail based on the following figures, wherein.

DETAILED DESCRIPTION OF THE INVENTION

Configuration of an Exemplary Embodiment

Figure 1:
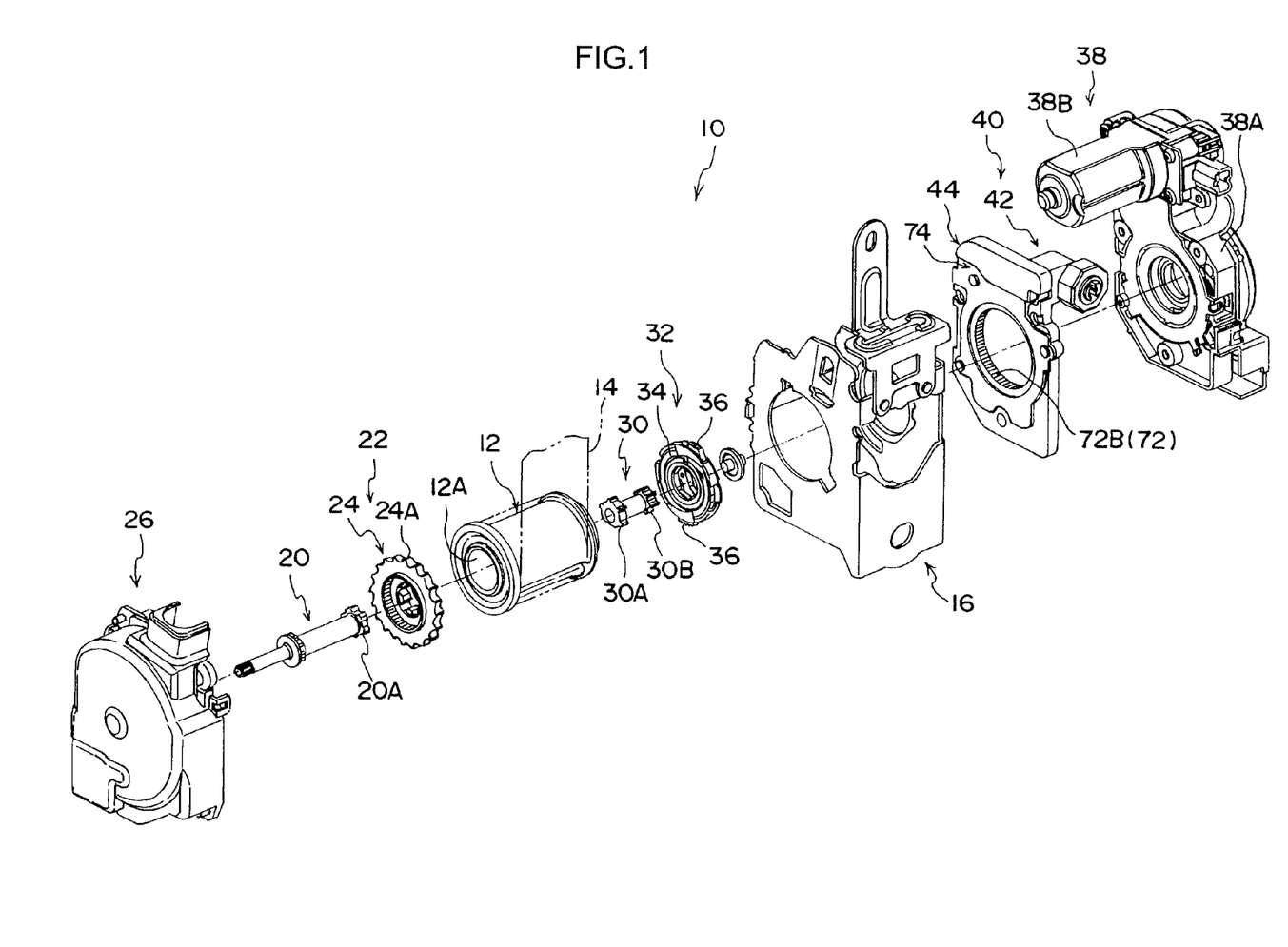
FIG. 1 is an exploded perspective view illustrating a webbing take-up device according to an exemplary embodiment of the present invention.

Explanation follows regarding a gas flow path structure and webbing take-up device according to an exemplary embodiment of the present invention, with reference to FIG. 1 to FIG. 5. FIG. 1 illustrates an exploded perspective view of a webbing take-up device 10 according to an exemplary embodiment of the present invention.

As shown in FIG. 1, the webbing take-up device 10 according to the exemplary embodiment is equipped with a spool 12 configuring a take-up shaft. The spool 12 is cast in a substantially circular cylindrical shape so as to have a webbing belt 14 wound in layers thereon. The spool 12 is rotatably supported at both axial direction ends by a frame 16 which is fixed on a vehicle.

A main torsion shaft 20 and a sub torsion shaft 30 configure a force limiter mechanism and are housed in a through hole 12A at an axial center portion of the spool 12. The main torsion shaft 20 and the sub torsion shaft 30 are disposed next to each other in a straight line manner along the spool 12 axial direction. The sub torsion shaft 30 serves as an energy absorbing member of the aspect of the invention. An end portion 20A on the side of the main torsion shaft 20 facing the sub torsion shaft 30 is retained by an axial direction intermediate portion within the spool 12.

A lock gear 24, configuring a first lock mechanism 22 on the left hand side of the spool 12 in FIG. 1, is attached to an axial direction intermediate portion of the main torsion shaft 20, with the lock gear 24 rendered incapable of relative rotation with respect to the main torsion shaft 20. External ratchet teeth 24A are formed on an outer peripheral portion of the lock gear 24. A lock plate (not shown in the drawings) configuring the first lock mechanism 22 is provided to the frame 16 so as to correspond to the ratchet teeth 24A. The lock plate is capable of moving relative to the ratchet teeth 24A so as to make contact with or move away from the ratchet teeth 24A. In an actuated state of the first lock mechanism 22, by a case where a rapid vehicle deceleration state arises or there is abrupt rotation of the spool 12 in the pullout direction, the lock plate is configured so as to mesh with the ratchet teeth 24A and restrict rotation of the ratchet teeth 24A in the pullout direction.

The lock gear 24 is covered from the side by a sensor cover 26. An acceleration sensor and the like is provided inside the sensor cover 26 for detecting vehicle acceleration. A pretensioner device, not shown in the drawings, is attached to the sensor cover 26. The pretensioner device is a device for moving a piston by actuating a gas generator (gas generating section) at a time of a rapid vehicle deceleration, and for rapidly rotating the spool 12 in the take-up direction by an amount corresponding to the movement stroke of the piston.

An end portion 30A (an axial direction one end portion) on the side facing the main torsion shaft 20 of the sub torsion shaft 30 is retained by an axial direction intermediate portion inside the spool 12. A second lock mechanism 32 is provided, as a shaft lock section which is lockable an axial direction another end portion 30B of the sub torsion shaft 30, on the right hand side of the spool 12 in FIG. 1. The second lock mechanism 32 is provided with a rotation body 34 that rotates integrally with the sub torsion shaft 30. Clutch plates 36 are attached near the outer peripheral portion of the rotation body 34 so as to be capable of rotating. The rotation body 34 is rotatably disposed inside an inside ratchet 72B of a lock ring 72 in the switching mechanism 40, described later, such that rotation of the rotation body 34 in the pullout direction can be restricted by the clutch plate 36 engaging with the inside ratchet 72B. The second lock mechanism 32 is configured to actuate when the main torsion shaft 20 has been deformed by twisting in a state where the first lock mechanism 22 is in an actuated state.

The rotation body 34 of the second lock mechanism 32 and the switching mechanism 40 are covered from the side, such as by a gear housing 38A of a motor mechanism 38 (PSB). A motor 38B and gears (not shown in the drawings) are provided in the gear housing 38A. Based on an electrical signal from an acceleration sensor, the motor mechanism 38 forcibly rotates the spool 12 in the take-up direction with the driving force of the motor 38B. In configurations not disposed with the motor mechanism 38 a cover shaped resin body is disposed in its place.

Figure 2:
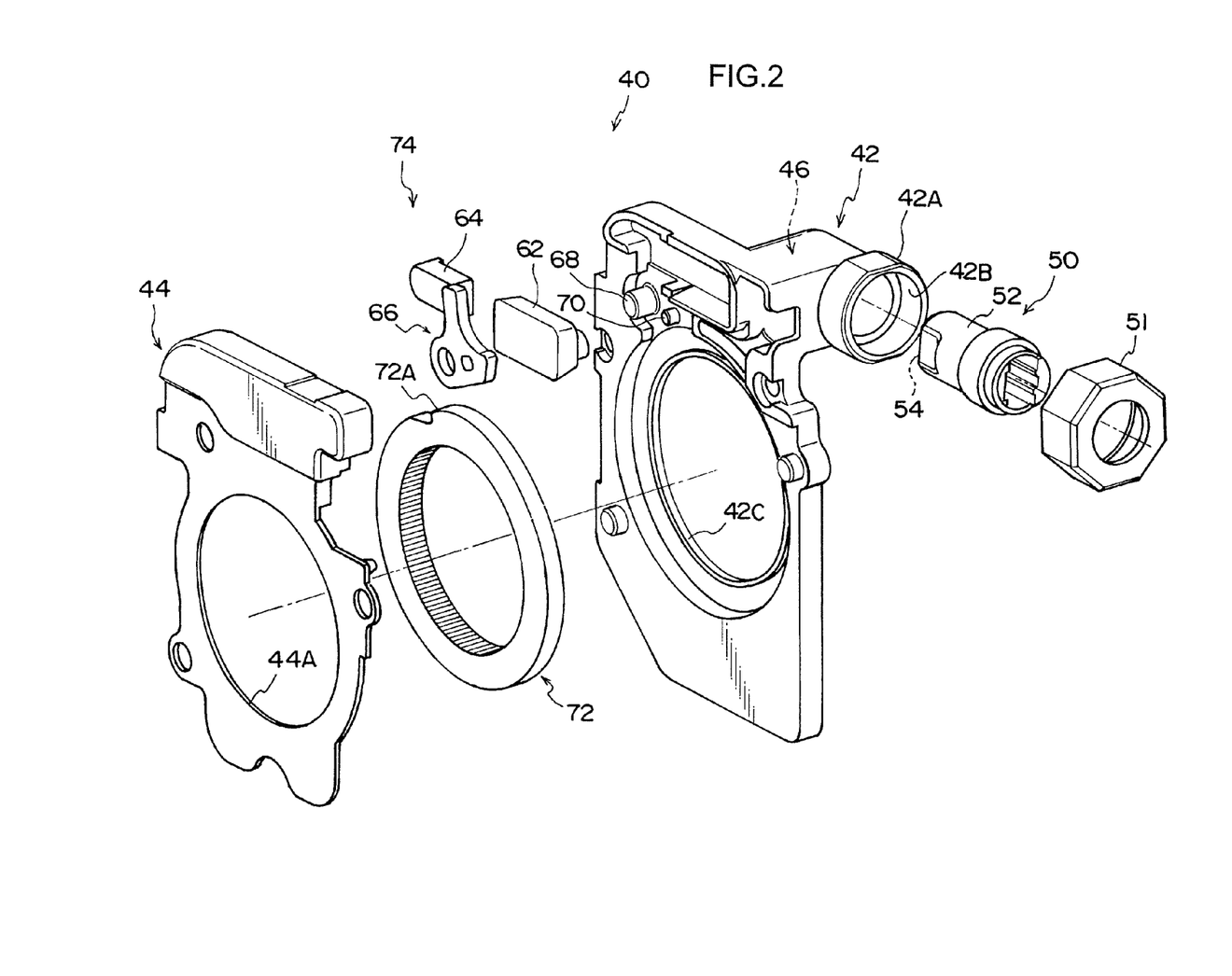
FIG. 2 is an exploded perspective view illustrating a switching mechanism of a webbing take-up device according an exemplary embodiment of the present invention.
Figure 3:
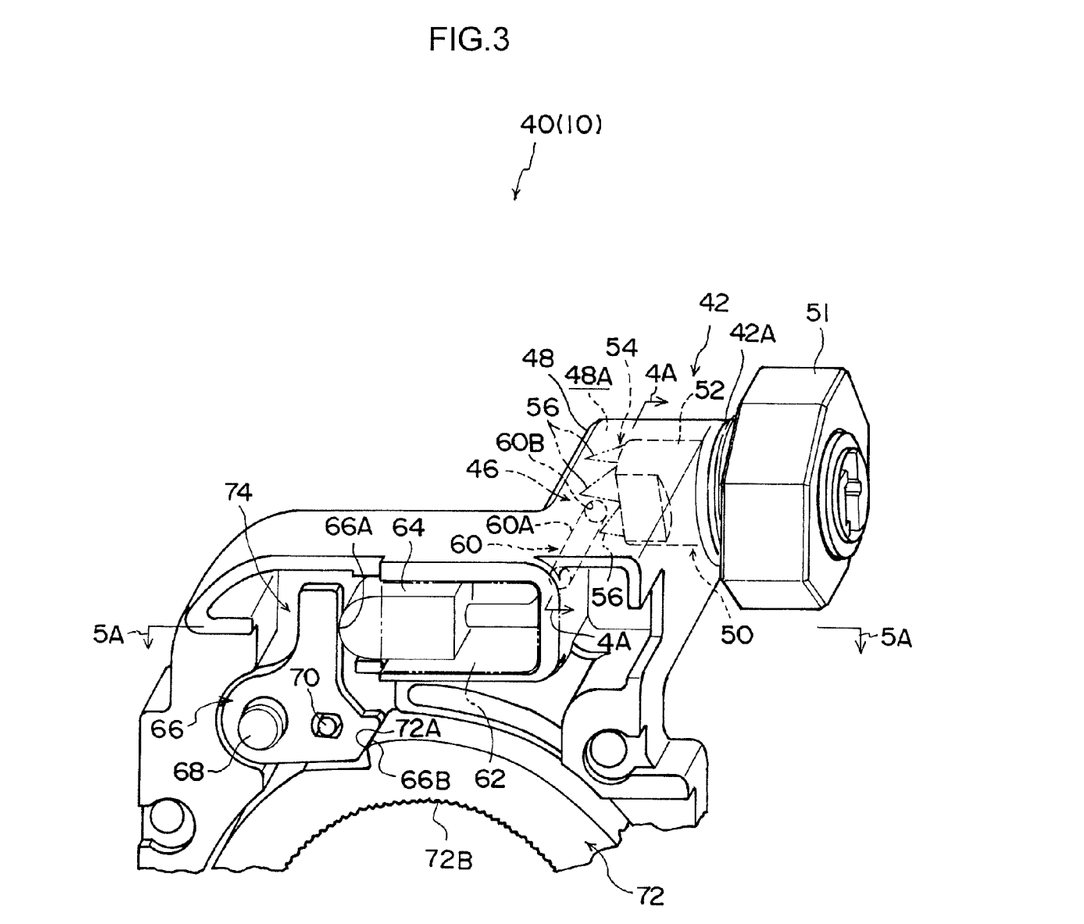
FIG. 3 is a schematic perspective view illustrating an upper portion side of a switching mechanism of a webbing take-up device according to an exemplary embodiment of the present invention, shown with a sheet removed.

FIG. 2 is an exploded perspective view illustrating the switching mechanism 40. FIG. 3 is a schematic perspective view of an upper portion side of the switching mechanism 40 viewed with the member on the nearside in the drawing (the sheet 44) removed. A gas flow structure 46 according to the present exemplary embodiment is provided at the upper portion side of the switching mechanism 40.

As shown in FIG. 3, the switching mechanism 40 is provided with a body 42. As shown in FIG. 1, in the body 42, a sheet 44 is attached at the device width direction inside, and the body 42 is connected to the outside of a side plate of the frame 16 in this state.

Figure 5A:
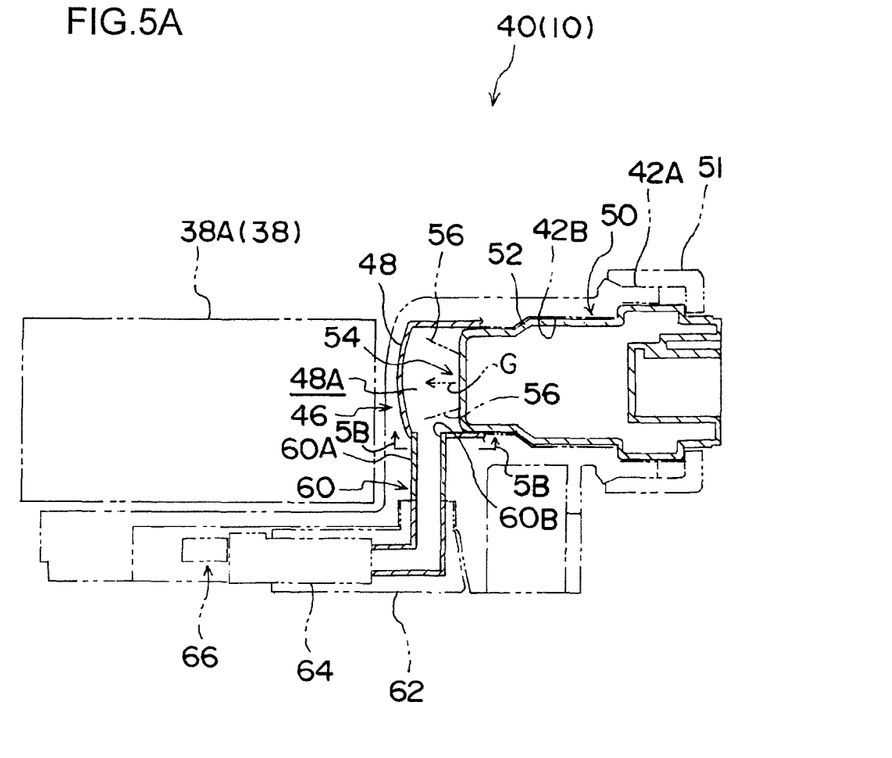
FIG. 5A is a schematic horizontal cross-section of the switching mechanism (gas flow path structure) of FIG. 3 taken on the line 5A-5A in FIG. 3.

As shown in FIG. 2 and FIG. 3, a generator mounting section 42A is formed at an upper portion of the body 42. The generator mounting section 42A is formed in a substantially cylindrical shape with its axial direction extending in a direction parallel to a direction orthogonal to the axial direction of the spool 12 (see FIG. 1). A generator housing hole 42B (see FIG. 2) is formed by a cylindrical inside portion of the generator mounting section 42A and a section extending therefrom at the upper portion of the body 42. As shown in FIG. 5A, which is a schematic cross-section taken along line 5A-5A of FIG. 3, a gas generator 50 (a micro gas generator) serving as a gas generation section is inserted into the generator housing hole 42B. A generator cap 51 is attached to the rear end outer peripheral side of the gas generator 50, with the generator cap 51 attached to an outer peripheral portion of the generator mounting section 42A. The gas generator 50 is thereby mounted to the generator mounting section 42A.

The gas generator 50 is equipped with a hollow shaped casing body 52 (an actuating cap), with a gas blowing section 54 provided on the leading end face side of the casing body 52, on the left hand side in FIG. 3. While not shown in the drawings, chemical agents such as an ignition agent and a gas generating agent are housed inside the casing body 52, together with an ignition device that ignites the ignition agent when input with an electrical ignition signal. By actuating of the gas generator 50 in this manner, gas is generated inside the casing body 52 so as to blow gas from the gas blowing section 54 of the casing body 52. The ignition device of the gas generator 50 is connected to an ECU (a control device), not shown in the drawings.

The ECU is either directly or indirectly connected to both a danger notification (forecasting) section and to a build (physique) detection section. The danger notification section either directly or indirectly detects when rapid vehicle deceleration occurs or when rapid vehicle deceleration is likely to occur, for example, it includes an acceleration sensor for detecting a rapid vehicle deceleration state, a distance sensor for detecting when the distance to an obstruction in front of the vehicle has become less than a specific value, and the like. The build detection section directly or indirectly detects the build of an occupant seated on a seat, for example, it includes a load (weight) sensor for detecting load acting on the vehicle seat, a belt sensor for detecting when more than a certain amount of the webbing belt 14 has been pulled out from the spool 12 illustrated in FIG. 1, and the like.

The ECU outputs an ignition signal to the ignition device of the gas generator 50 shown in FIG. 3 when the following two conditions are satisfied: the ECU has determined that a rapid vehicle deceleration state has arisen or that a rapid vehicle deceleration state is likely to arise, based on the signal from the danger notification section; and the ECU has determined that the build of the occupant seated on the seat is smaller than a predetermined standard value.

Figure 4A:
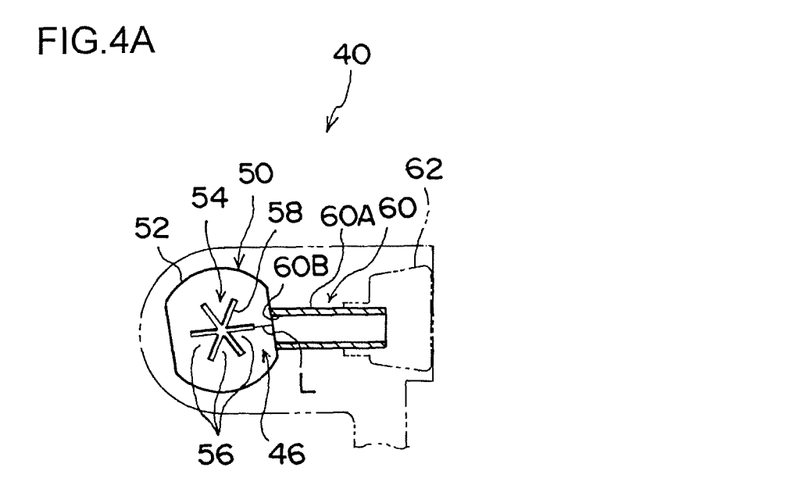
FIG. 4A and FIG. 4B are explanatory diagrams of the switching mechanism (gas flow path structure) of FIG. 3, shown with door portions of a gas generator before and after opening, with FIG. 4A corresponding to a cross-section taken on line 4A-4A of FIG. 3 illustrating a closed state of door portions in the gas generator, and FIG. 4B illustrating an opened state of the door portions in the gas generator.
Figure 6:
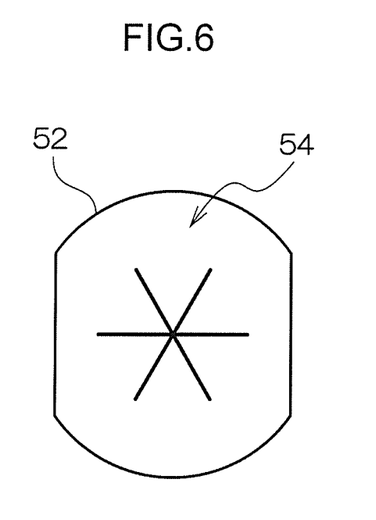
FIG. 6 is a simplified view showing grooves (tear lines).

As shown in FIG. 4A, which is a schematic cross-section taken on line 4A-4A in FIG. 3, a gas blowing section 54 of the gas generator 50 is provided with plural (six in the present exemplary embodiment) door portions 56. The door portions 56 are configured so as to be sectioned in plural manner by radial manner slits 58, such that in a state where gas is generated by the gas generator 50 the door portions 56 open out toward the outside of the casing body 52 (burst deployment) with divided by the slits 58 (see FIG. 3 where the door portions 56 are illustrated by broken lines in FIG. 3, and also FIG. 4B). In the present exemplary embodiment the door portions 56 are sectioned plural by the slits 58, however in place of the slits 58 configuration may be made with grooves (tear lines) (see FIG. 6) provided in similar positions to the slits 58.

As shown in FIG. 5A, a peripheral wall section 48 is provided at the upper portion of the body 42 so as to form an deployment space (door portions opening out space) 48A to permit the door portions 56 to open (deploy). A gas flow path section 60 is connected in the peripheral wall section 48 and in communication with the deployment space 48A. The gas flow path section 60 is employed to let gas generated by the gas generator 50 flow through. As shown in FIG. 3, a upstream portion 60A of the gas flow path section 60 is formed along a direction substantially orthogonal to the gas blowing direction from the gas blowing section 54 (the direction along which the door portions 56 are pressed by gas). An opening portion 60B at the gas inflow side of the gas flow path section 60 is provided so as to communicate with a space which is located between the (two in the exemplary embodiment) door portions 56 which are adjacent (next to) each other in a state where the door portions 56 are in a deployed (opened) state and so as not to overlap with the door portions 56 in the opened state.

More specifically, when viewed from the opposite side to that of the gas blowing section 54 is provided (viewed along the gas blowing direction from the gas blowing section 54), as shown in FIG. 4A, in the initial state before the door portions 56 are opened, the opening portion 60B on the gas inflow side of the gas flow path section 60 are set such that an extension line L of at least one of the slits 58 (or of the grooves for configuration in which grooves are formed in place of the slits 58) is provided in a position within the range of the opening portion 60B on the gas inflow side (such that the extension line L crosses the background line of the opening portion 60B in FIG. 4A).

(The extension line L is a line extending from an end of the at least one of the slits 58 toward a side opposite to the center of the gas blowing section 54.)

Figure 5B:
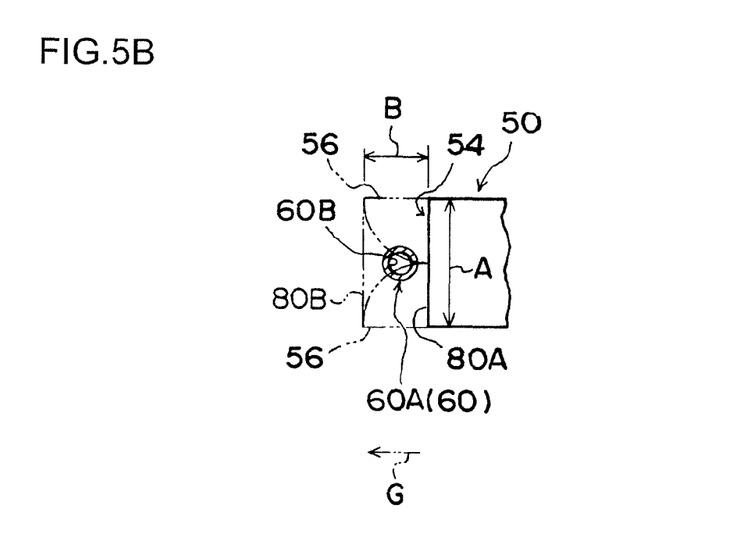
FIG. 5B is a cross-section taken along line 5B-5B in FIG. 5A illustrating the positional relationship between an opening portion of the gas inflow side of a gas flow path section and a gas generator, with the peripheral wall section not shown in FIG. 5B.

FIG. 5B illustrates the positional relationship between the opening portion 60B on the gas inflow side of the gas flow path section 60 and the gas generator 50, which is a drawing corresponding to a cross-section taken on line 5B-5B in FIG. 5A. The peripheral wall section 48 (see FIG. 5A) is not shown in the drawing of FIG. 5B. As shown in FIG. 5B, when viewed along the extension direction of the upstream portion 60A of the gas flow path section 60 (see FIG. 5A), the opening portion 60B on the gas inflow side of the gas flow path section 60 is set to be provided between a first position 80A, which is a position of the outer face of the gas blowing section 54, and a second position 80B that faces the first position 80A and is separated from the first position 80A along the gas blowing direction (see the arrow G direction) by a length (=B) that is ½ of the length of the maximum diameter A of the gas blowing section 54.

The length (this being B) that is ½ of the length of the maximum diameter A of the gas blowing section 54 corresponds to a length which is between a position of the tip of the door portion 56 and the first position 80A in a state where the door portion 56 is disposed orthogonal to (has attitude orthogonal to) the first position 80A (orthogonal to the outer face position of the gas blowing section 54) in a virtual state where the maximum conceivable amount of rupturing has occurred from the central position of the gas blowing section 54 to an extended portion (see FIG. 4A) extending out from the slit 58 when the gas generator 50 blows gas from the gas blowing section 54.

As shown in FIG. 3, in the present exemplary embodiment the gas flow path section 60 bends around on the downstream side at substantially a right angle, and is inserted into a cylinder 62 at an upper portion of the body 42. A piston 64 is slidably housed inside the cylinder 62. Note that FIG. 3 illustrates the piston 64 with the cylinder 62 which is shown by broken imaginary lines. The piston 64 is moved by pressure of the gas generated by the gas generator 50.

The tip end portion of the piston 64 is in contact with a pressed portion 66A provided at one end side of a substantially L-shaped pawl 66. An intermediate portion of the pawl 66 fits over a support shaft 68 formed so as to project out from an upper portion of the body 42. The pawl 66 is thereby capable of swinging (rotating) about the support shaft 68. A shear pin 70, formed so as to project out from an upper portion of the body 42, passes through the pawl 66 at a position near another end of the pawl 66. The shear pin 70 restricts the pawl 66 from swinging about the support shaft 68.

A support portion 66B is provided at the other end of the pawl 66. The support portion 66B supports an outside ratchet 72A of the lock ring 72. The lock ring 72 is formed in a ring shape and is freely rotatably housed in the body 42, with the outside ratchet 72A formed at a portion on the outer peripheral side of the lock ring 72. The lock ring 72 is restricted from rotation by the outside ratchet 72A being supported by the support portion 66B of the pawl 66.

As shown in FIG. 2, a circular hole 42C and a circular hole 44A are formed in the body 42 and the sheet 44, respectively, so as to correspond to the inner periphery of the lock ring 72. The circular holes 42C and 44A are disposed substantially coaxially to the spool 12 (see FIG. 1). The internal diameter dimensions of the circular holes 42C and 44A are set sufficiently larger than the outer diameter dimension of the rotation body 34 of the second lock mechanism 32 illustrated in FIG. 1. The inside ratchet 72B is formed to an inner peripheral portion of the lock ring 72 disposed coaxially to the circular holes 42C, 44A (see FIG. 2). As explained above, the clutch plates 36 provided to the rotation body 34 are configured so as to be engageable with the inside ratchet 72B.

The switching section 74 is configured as "switching section" including the body 42, the sheet 44, the cylinder 62, the piston 64, the pawl 66, the shear pin 70 and the lock ring 72 as illustrated in FIG. 2 and explained above. Namely, the switching section 74 illustrated in FIG. 3 is configured so that, by actuation by gas flowing through the gas flow path section 60, a state in which rotation of the lock ring 72 is permitted is provided, thereby switching to a state in which locking of the axial direction the other end portion 30B of the sub torsion shaft 30 by the second lock mechanism 32 shown in FIG. 1 is non-lockable.

Operation and Effect of the Exemplary Embodiment
Explanation follows regarding the operation and effect of the above exemplary embodiment.

In the webbing take-up device 10 shown in FIG. 1, when the acceleration sensor of the first lock mechanism 22 detects a rapid vehicle deceleration state, or when the spool 12 is abruptly rotated in the pullout direction by the body of an occupant abruptly pulling on the webbing belt 14 fitted over the body as the body of the occupant attempts to move rapidly towards the vehicle front side under inertia during rapid deceleration, first, the lock plate (not shown in the drawings) meshes with the ratchet teeth 24A of the lock gear 24 in the first lock mechanism 22. So, there is in the first lock state in which rotation of the lock gear 24 in the pullout direction is restricted. By restricting rotation of the lock gear 24 in the pullout direction, rotation of the main torsion shaft 20 in the pullout direction is also restricted. Restricting rotation of the main torsion shaft 20 in the pullout direction leads to rotation of the spool 12 in the pullout direction being restricted. The main torsion shaft 20 undertakes twisting deformation when in this state a rotational force is imparted to the spool 12 of a magnitude that exceeds the torsional rigidity of the main torsion shaft 20, resulting in corresponding rotation of the spool 12 being permitted and energy being absorbed.

The second lock mechanism 32 is actuated when the main torsion shaft 20 is deformed by twisting in the first lock mechanism 22 being in the actuated state, the second lock state is achieved with the clutch plate 36 provided to the rotation body 34 engaging with the inside ratchet 72B. The second lock state restricts pullout direction rotation of the rotation body 34 that rotates integrally with the sub torsion shaft 30. Rotation of the sub torsion shaft 30 in the pullout direction is thereby restricted. Due to relative rotation between the sub torsion shaft 30 and the spool 12 being prevented, restricting rotation of the sub torsion shaft 30 in the pullout direction also restricts rotation of the spool 12 in the pullout direction. In this state, the main torsion shaft 20 and the sub torsion shaft 30 both deform by twisting when a rotation force is imparted to the spool 12 in the pullout direction of magnitude exceeding the sum of the torsional rigidities of both the main torsion shaft 20 and the sub torsion shaft 30. Corresponding rotation of the spool 12 is thereby permitted and energy is absorbed.

The second lock mechanism 32 is configured to actuate when the main torsion shaft 20 has been deformed by twisting with the first lock mechanism 22 is in an actuated state, and locking of the other end portion 30B in the axial direction of the sub torsion shaft 30 by the second lock mechanism 32 can be switched to a non-lockable state in accordance with determination by the ECU. When locking of the axial direction the other end portion 30B of the sub torsion shaft 30 by second lock mechanism 32 has been switched to a non-lockable state, rotation of the spool 12 is permitted by a rotation force acting in the pullout direction of magnitude exceeding the torsional rigidity of the main torsion shaft 20.

Specific explanation follows regarding switching locking of the axial direction the other end portion 30B of the sub torsion shaft 30 by the second lock mechanism 32 to a state non-lockable.

First, when the ECU has determined that a rapid vehicle deceleration state has arisen or that a rapid vehicle deceleration state is likely based on the signal from the danger notification section and it has determined that the build of the occupant seated in the vehicle seat is less than a predetermined standard value, the ECU then outputs an ignition signal to the ignition device of the gas generator 50 shown in FIG. 3. Gas is thereby generated in the casing body 52 by the actuation of the gas generator 50, and gas is blown from the gas blowing section 54 of the casing body 52.

Figure 4B:
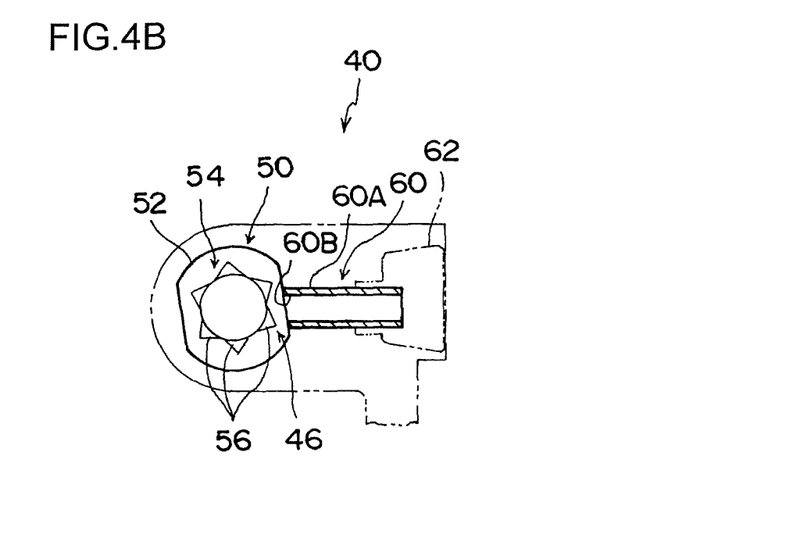

As shown in FIG. 4A, plural sectioned door portions 56 are formed by slits 58 in the gas blowing section 54 of the casing body 52. In a state in which gas has been generated by the gas generator 50 the plural door portions 56 part at the slits 58 and open out towards the outside of the casing body 52, as shown in FIG. 4B. Namely gas is blown from the gas blowing section 54 of the casing body 52 by the door portions 56 opening (deploying). As shown in FIG. 5A, the gas flow path section 60 is connected to the peripheral wall section 48 configuring the deployment space 48A for permitting opening of the door portions 56. The gas flows through the gas flow path section 60 due to the gas flow path section 60 being in communication with the deployment space 48A. The piston 64 slides due to pressure of the gas that has flowed through the gas flow path section 60 illustrated in FIG. 3. On being pressed by the piston 64, the pawl 66 swings while shearing the shear pin 70, and the support portion 66B of the pawl 66 moves away from the outside ratchet 72A of the lock ring 72.

In this state, suppose that the clutch plate 36 of the second lock mechanism 32 illustrated in FIG. 1 is engaged with the inside ratchet 72B and a rotational force is imparted to the spool 12 in the pullout direction of magnitude exceeding the torsional rigidity of the main torsion shaft 20, the lock ring 72 rotates together with the sub torsion shaft 30 and the rotation body 34. Namely, by actuating the switching section 74 by gas flowing through the gas flow path section 60 of FIG. 3, locking of the axial direction the other end portion 30B of the sub torsion shaft 30 by the second lock mechanism 32 of FIG. 1 is switched to a state non-lockable.

Explanation next follows regarding gas flowing to the gas flow path section 60 (see FIG. 3) when performing of the switching referred to above. As shown in FIG. 3, the gas flow path section 60 is formed with: the upstream portion 60A that runs in a direction orthogonal to the direction of gas blowing from the gas blowing section 54 (the direction the door portions 56 are pressed by gas (by gas pressure)); and with the opening portion 60B at the gas inflow side, configured as to communicate with a space which is between adjacent door portions 56 when the door portions 56 are in an opened state. Hence, as shown in FIG. 5A, even in a case where the installation space (the installation position) for the gas generator 50 is limited by the positional relationship to peripheral equipment (the gear housing 38A of the motor mechanism 38 in the present exemplary embodiment), resulting in the portion, facing the gas blowing section 54, at the peripheral wall section 48 being positioned in the vicinity of the tip portions of the door portions 56 when in the opened state, as shown in FIG. 3, the generated gas flows out to the gas flow path section 60 through between the adjacent door portions 56 that have been opened by the generated gas.

Further explanation is that, in the present exemplary embodiment, the opening portion 60B on the gas inflow side of the gas flow path section 60 is, as shown in FIG. 4A, set such that the extension line L extending from one of the slits 58 is positioned inside the range of the opening portion 60B on the gas inflow side when viewed from the opposite side of the gas blowing section 54. Accordingly, when the door portions 56 have opened with the slits 58 being as the boundaries thereof, a configuration is achieved in which the (adjacent) door portions 56 are opened so as to avoid from the opening portion 60B. As a result the opening portion 60B is not blocked by the door portions 56 also after the door portions 56 have been opened. The gas accordingly flows through between the adjacent door portions 56 to the gas flow path section 60.

In the present exemplary embodiment, when viewed, as shown in FIG. 5B, along the extension direction of the upstream portion 60A of the gas flow path section 60 (see FIG. 5A), the opening portion 60B on the gas inflow side of the gas flow path section 60 is provided (set) between the first position 80A which is at the outer face position of the gas blowing section 54 and the second position 80B facing towards the first position 80A and separated in the gas blowing direction (the arrow G direction) from the first position 80A by a length (=B) that is ½ of the length of maximum diameter A of the gas blowing section 54. Consequently, the separation distance between the gas blowing section 54 and the portion on the blown side that face the gas blowing section 54 can be suppressed.

As explained above, according to the gas flow structure 46 and the webbing take-up device 10 of the present exemplary embodiment, a gas flow path can be secured even in a case a distance between the gas blowing section 54 and a portion facing the gas blowing section 54. As a result a desired internal pressure is stably obtained and the switching section 74 (and in particular the piston 64) efficiently actuated.

Configuration in the above exemplary embodiment is such that locking of the axial direction the other end portion 30B of the sub torsion shaft 30 by the second lock mechanism 32 of FIG. 1 is switched to non-lockable, by actuating the switching section 74 with gas flowing through the gas flow path section 60. However, configuration may alternatively be made such that locking of another end portion in the axial direction of a torsion shaft by a shaft lock section is switched to lockable by actuating a switching section with gas flowing through a gas flow path section. Namely, configuration may be made such that, for example, with explained by using a part of the configuration shown in FIG. 3, in the state prior to actuating the switching section, a lock ring 72 is disposed in a free-rotation state, and when the switching section is actuated a piston 64 slides due to gas flowing through a gas flow path section 60 such that a pawl 66 anchors the lock ring 72.

In the above exemplary embodiment, configuration is preferably made from the perspective of gas flow characteristics such that the opening portion 60B on the gas inflow side of the gas flow path section 60 of FIG. 3 is provided so as not to overlap with the door portions 56 when the door portions 56 are in an opened state. However, configuration may be made such that the opening portion at the gas inflow side of the gas flow path partially overlaps with the door portion(s) when in the opened state.

Furthermore, whereas in the above exemplary embodiment the gas flow structure 46 is provided as part of the switching mechanism 40 of the webbing take-up device 10, the gas flow path structure may, for example, be employed in another mechanism, such as part of a pretensioner device in a webbing take-up device, or in another device.

What is claimed is:

1. A gas flow structure comprising: a gas generation section that is equipped with a tubular, hollow casing body and a tubular, hollow gas blowing section having an outlet end terminating in a end face that completely extends across the outlet end and is substantially orthogonal to a direction of gas flow, the gas generation section generating gas inside the casing body on actuation thereof and the gas being blown from the gas blowing section through the end face; a plurality of door portions that are provided at the end face of the gas blowing section, the door portions being defined by slits or grooves, the door portions parting at the slits or the grooves by the gas is generated by the gas generation section such that all of the door portions deploy towards the outside of the casing body in the direction of gas flow; a peripheral wall section configuring a deployment space for permitting the door portions to deploy; and a gas flow path section for the gas generated by the gas generation section to flow through, the gas flow path section being connected to the peripheral wall section so as to communication with the deployment space, an upstream portion of the gas flow path section being formed along a direction orthogonal to a direction of the gas blowing from the gas blowing section, and an opening portion of the gas flow path section at a side of the gas inflowing being set so as to communicate with a space which is located between the door portions which are adjacent to each other in a state where the door portions are in a deployed state, wherein, when viewed along an extension direction of the upstream portion of the gas flow path section: the opening portion of the gas flow path section at the side of the gas inflowing is set to be provided between a first position which is at an outer face position of the gas blowing section and a second position facing the first position, which is separated from the first position in the direction of the gas blowing by a distance of ½ of a length of a maximum diameter of the gas blowing section, and wherein, when viewed along the direction of the gas blowing: the opening portion of the gas flow path section at the side of the gas inflowing is set to be provided such that an extension line extending from an end of at least one of the slits or the grooves toward a side opposite to a center of the gas blowing section crosses the opening portion of the gas flow path section at the side of the gas inflowing.

2. A webbing take-up device comprising: a gas flow structure including: a gas generation section that is equipped with a tubular, hollow casing body and a tubular, hollow gas blowing section having an outlet end terminating in an end face that completely extends across the outlet end and is substantially orthogonal to a direction of gas flow, the gas generation section generating gas inside the casing body on actuation thereof and the gas being blown from the gas blowing section through the end face; a plurality of door portions that are provided at the end face of the gas blowing section, the door portions being defined by slits or grooves, the door portions parting at the slits or the grooves by the gas is generated by the gas generation section such that all of the door portions deploy towards the outside of the casing body in the direction of gas flow; a peripheral wall section configuring a deployment space for permitting the door portions to deploy; and a gas flow path section for the gas generated by the gas generation section to flow through, the gas flow path section being connected to the peripheral wall section so as to communication with the deployment space, an upstream portion of the gas flow path section being formed along a direction orthogonal to a direction of the gas blowing from the gas blowing section, and an opening portion of the gas flow path section at a side of the gas inflowing being set so as to communicate with a space which is located between the door portions which are adjacent to each other in a state where the door portions are in a deployed state; a spool formed in a tubular shape on which a webbing belt is wound in layer manner; an energy absorbing member housed in an axial center portion of the spool and disposed along an axial direction of the spool, an end portion in the axial direction of the energy absorbing member being retained by the spool; a shaft lock section capable of locking the other end portion in the axial direction of the energy absorbing member; and a switching section that is actuated by the gas flowing through the gas flow path section to switch locking of the other end portion in the axial direction of the energy absorbing member by the shaft lock section to a lockable state or to a non-lockable state, wherein, when viewed along an extension direction of the upstream portion of the gas flow path section: the opening portion of the gas flow path section at the side of the gas inflowing is set to be provided between a first position which is at an outer face position of the gas blowing section and a second position facing the first position, which is separated from the first position in the direction of the gas blowing by a distance of ½ of a length of a maximum diameter of the gas blowing section, and wherein, when viewed along the direction of the gas blowing: the opening portion of the gas flow path section at the side of the gas inflowing is set to be provided such that an extension line extending from an end of at least one of the slits or the grooves toward a side opposite to a center of the gas blowing section crosses the opening portion of the gas flow path section at the side of the gas inflowing.

* * * * *